United States Patent [19]

Hata

[11] Patent Number: 5,751,519
[45] Date of Patent: May 12, 1998

[54] BEARING UNIT, CARRIAGE ASSEMBLY WITH THE BEARING UNIT, AND MAGNETIC DISK APPARATUS

[75] Inventor: Tetsuya Hata, Tokyo, Japan

[73] Assignee: Kabushiki Kaisha Toshiba, Kanagawa-Ken, Japan

[21] Appl. No.: 719,794

[22] Filed: Sep. 25, 1996

[30] Foreign Application Priority Data

Mar. 18, 1996 [JP] Japan .................... 8-061455

[51] Int. Cl.$^6$ ............................................ G11B 5/55
[52] U.S. Cl. ............................................ 360/106
[58] Field of Search ........................ 360/105–106, 360/104, 97.01, 97.03; 384/512–514

[56] References Cited

U.S. PATENT DOCUMENTS

| | | | |
|---|---|---|---|
| 5,301,078 | 4/1994 | Makino et al. | 360/106 |
| 5,446,608 | 8/1995 | Sanada | 360/97.02 |
| 5,463,515 | 10/1995 | Koriyama | 360/106 |
| 5,491,598 | 2/1996 | Stricklin et al. | 360/104 |
| 5,491,599 | 2/1996 | Sogabe | 360/104 |
| 5,512,725 | 4/1996 | Kelemer et al. | 360/106 |
| 5,550,694 | 8/1996 | Hyde | 360/104 |
| 5,550,695 | 8/1996 | Matsumoto | 360/105 |

FOREIGN PATENT DOCUMENTS

| | | |
|---|---|---|
| 62-98057 | 6/1987 | Japan . |
| 63-78369 | 5/1988 | Japan . |
| 1-124970 | 5/1989 | Japan . |
| 4-134676 | 5/1992 | Japan . |

*Primary Examiner*—Allen Cao
*Attorney, Agent, or Firm*—Limbach & Limbach LLP

[57] ABSTRACT

A bearing unit of a carriage assembly includes a support shaft and a sleeve rotatably supported outside the support shaft through a lower bearing and an upper bearing. The sleeve has a flange on its upper end portion. A threaded portion with which a fixing nut is to be threadably engaged is formed on the outer circumference of the lower end portion of the sleeve. The threaded portion is aligned with the lower bearing in the radial direction of the sleeve. A groove is formed in the lower end of the sleeve at a position between the threaded portion and the lower bearing. This groove reduces a load acting on the lower bearing when the nut is threadably engaged with the threaded portion.

14 Claims, 5 Drawing Sheets

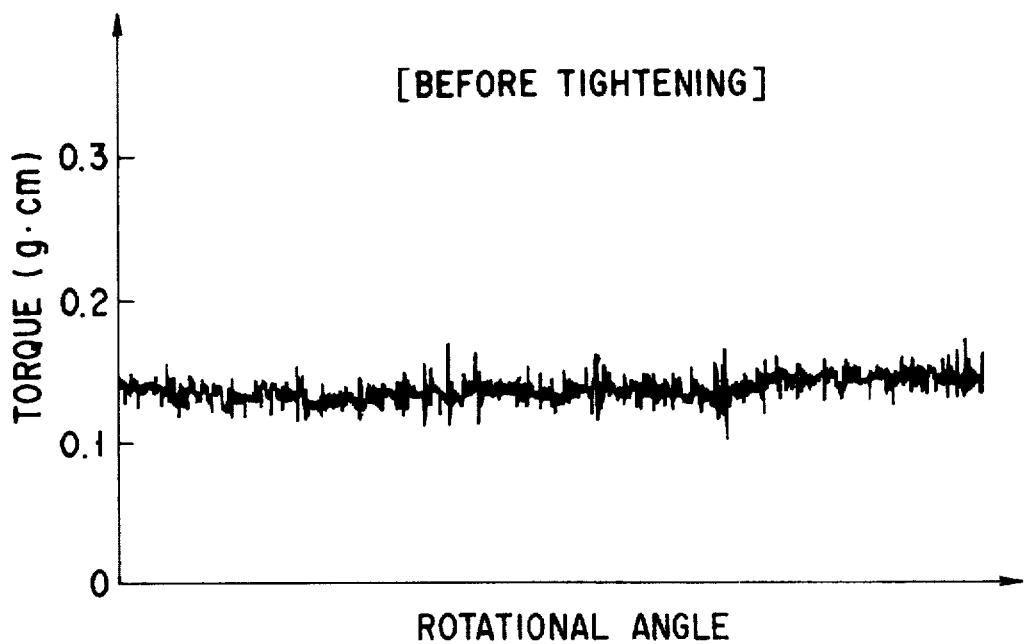
F I G. 5
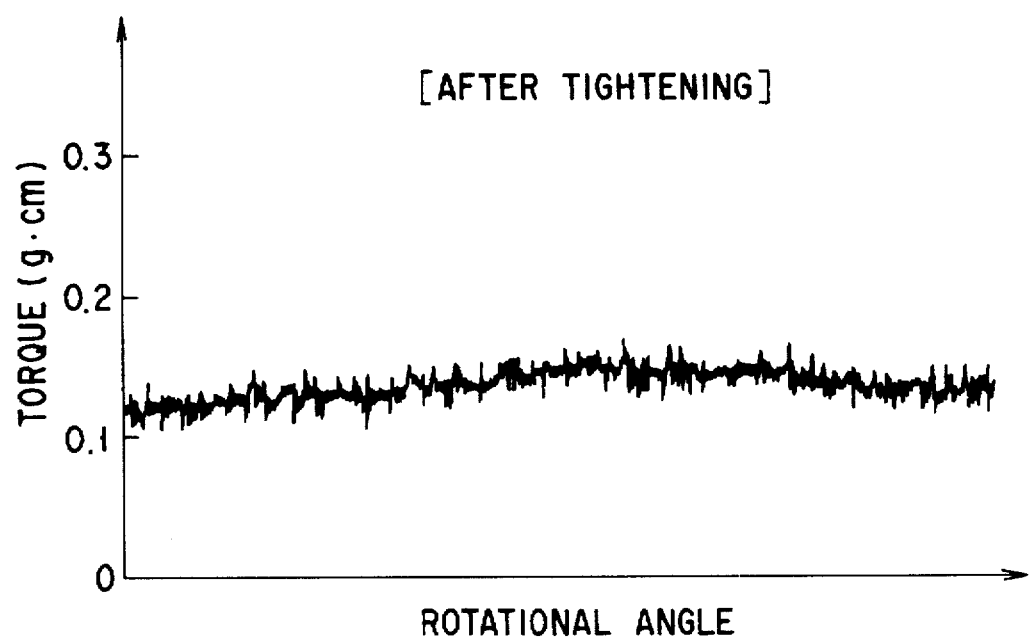
F I G. 6

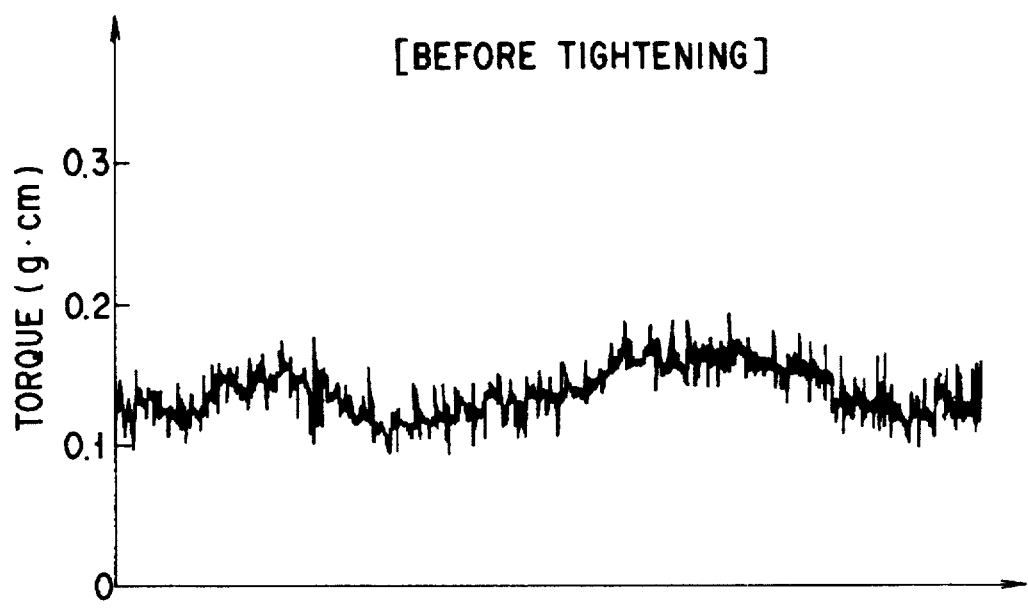
FIG. 7 [PRIOR ART]
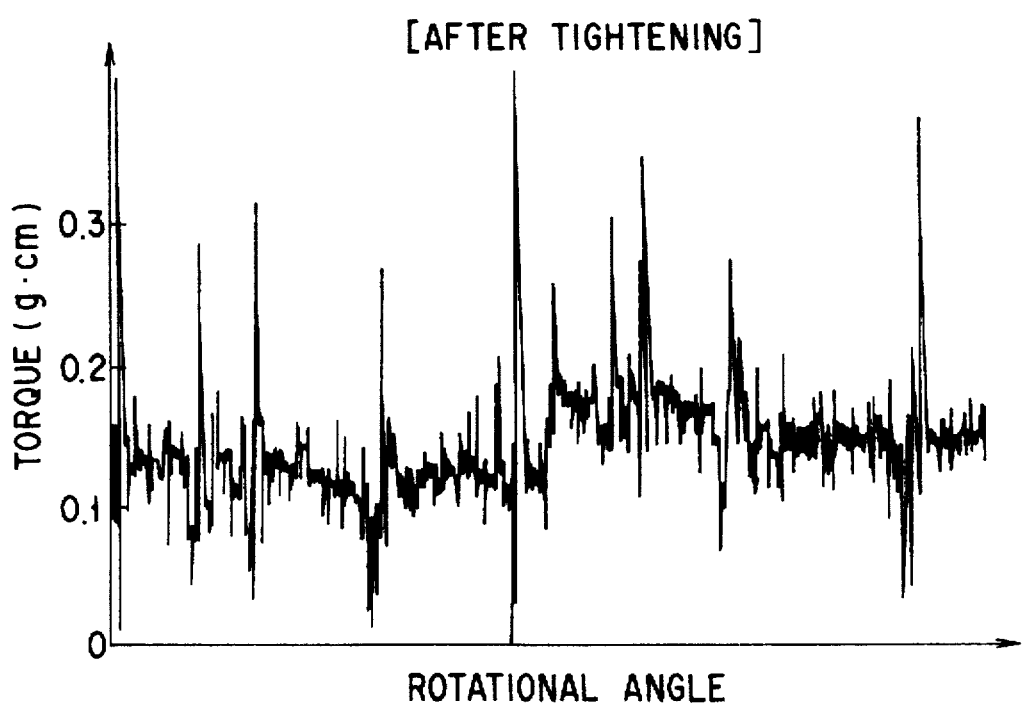
FIG. 8 [PRIOR ART]

BEARING UNIT, CARRIAGE ASSEMBLY WITH THE BEARING UNIT, AND MAGNETIC DISK APPARATUS

BACKGROUND OF THE INVENTION

1. Field of the Invention

The present invention relates to a bearing unit for rotatably supporting members to be supported, a carriage assembly of a magnetic disk apparatus, which has the bearing unit, and a magnetic disk apparatus having a plurality of magnetic heads.

2. Description of the Related Art

Recently, magnetic disk apparatuses have been widely used as memories for storing a large amount of information for electronic devices such as personal computers, laptop computers, and notebook type computers.

In general, a magnetic disk apparatus of this type includes a magnetic disk as a recording medium, a plurality of magnetic head assemblies having a plurality of magnetic heads for recording/reproducing information on/from the magnetic disk, a carriage assembly movably supporting the magnetic head assemblies with respect to the magnetic disk, a voice coil motor for rotating the carriage assembly to move the magnetic heads to desired track positions on the magnetic disk.

Two magnetic head assemblies having magnetic heads are arranged for one magnetic disk to oppose the upper and lower surfaces of the magnetic disk. For example, a magnetic disk apparatus having two magnetic disks includes four magnetic head assemblies.

The carriage assembly supporting the magnetic head assemblies includes a plurality of arms mounted with the respective magnetic head assemblies, and a bearing unit on which the arms are mounted.

In general, the bearing unit has a fixed support shaft and a cylindrical sleeve disposed outside the support shaft. This sleeve is rotatably supported on the support shaft through two bearings fitted between the sleeve and the support shaft.

The sleeve has a flange at its one end, and a threaded portion formed on the outer circumference of the other end portion. After a plurality of arms, and a support ring which supports the coil of the voice coil motor is mounted on the outer circumference of the sleeve, a nut is threadably engaged with the threaded portion. With this operation, the arms and the support ring are clamped between the flange and the nut, thereby supporting the respective parts.

By rotating the sleeve about the support shaft, the magnetic heads are moved over the magnetic disk and positioned to desired tracks.

In the bearing unit of the carriage assembly having the above structure, the threaded portion of the sleeve is generally formed at a position shifted from the bearing mounted inside the sleeve in the axial direction.

With a reduction in the size of a personal computer or the like having a magnetic disk apparatus, efforts have recently been made to reduce the size of the magnetic disk apparatus itself. As the size of the magnetic disk apparatus decreases, the heights of the support shaft and sleeve of the bearing unit, i.e., the lengths in the axial direction, decrease. For this reason, if standard bearings are used for the bearing unit, the threaded portion of the sleeve is located outside the lower bearing and overlaps with the lower bearing in the radial direction.

In such a structure, when the nut is threadably engaged with the threaded portion of the sleeve in assembling the carriage assembly, a load caused by tightening of the nut directly acts on the lower bearing located inside the threaded portion. As a result, the lower bearing undergoes an inconvenience such as deformation or distortion. In this case, the sleeve cannot be smoothly rotated, and control of a driving torque for rotating the sleeve is difficult to perform. In addition, the positioning precision of each magnetic head is adversely affected.

SUMMARY OF THE INVENTION

The present invention has been made in consideration of the above circumstances, and has as its object to provide a bearing unit which prevents deformation, distortion, or the like of a bearing in an assembly operation, and can support members to be supported so as to allow them to smoothly rotate, a carriage assembly having the bearing unit, and a magnetic disk apparatus having the bearing unit.

In order to achieve the above object, a bearing unit according to the present invention comprises a support shaft, a cylindrical sleeve arranged to coaxially surround the support shaft and having a first end portion on which a flange is formed, and a second end portion having an outer circumferential surface on which a threaded portion is formed, a plurality of bearings arranged between the support shaft and the sleeve to be spaced apart from each other in an axial direction of the support shaft, for rotatably supporting the sleeve, and a nut threadably engaged with the threaded portion to hold a member to be supported on the outer circumferential surface of the sleeve between the flange and the nut. The plurality of bearings include a lower bearing aligned with the threaded portion in a radial direction of the sleeve. The sleeve has a groove formed between the threaded portion and the lower bearing, for reducing a tightening force of the nut which acts on the lower bearing.

According to the bearing unit having the above structure, in an assembly process, members to be supported are mounted first on the outer circumferential surface of the sleeve, and the nut is threadably engaged with the threaded portion of the sleeve, thereby clamping the members between the nut and the flange of the sleeve and holding the members on the sleeve.

In tightening the nut, a tightening force acting on the lower bearing located inside the threaded portion of the sleeve is reduced by the groove formed in the sleeve. When a force acting in the direction of the lower bearing is generated, the end portion of the sleeve on which the threaded portion is formed is deformed toward the lower bearing. However, this deformation is absorbed by the groove and prevented from being transferred to the lower bearing. This mechanism prevents deformation, distortion, or the like of the bearing mounted inside the sleeve, thus allowing smooth rotation of the sleeve.

In addition, a bearing unit according to the present invention comprises a support shaft, a cylindrical sleeve arranged to coaxially surround the support shaft and having a first end portion on which a flange is formed, and a second end portion having an outer circumferential surface on which a threaded portion is formed, a plurality of bearings arranged between the support shaft and the sleeve to be spaced apart from each other in an axial direction of the support shaft, for rotatably supporting the sleeve, and a nut threadably engaged with the threaded portion to hold the members on the outer circumferential surface of the sleeve between the flange and the nut.

The plurality of bearings include a lower bearing aligned with threaded portion of the sleeve in a radial direction of the sleeve, and inner and outer circumferential surfaces of each of the bearings, excluding an outer circumferential surface of the lower bearing, are respectively bonded to an outer circumferential surface of the support shaft and an inner circumferential surface of the sleeve.

According to the bearing unit having the above structure, in an assembly operation, the members are mounted first on the outer circumferential surface of the sleeve, and the nut is threadably engaged with the threaded portion of the sleeve, thereby clamping the members between the nut and the flange of the sleeve and holding the members on the sleeve.

When the nut is threadably engaged with the threaded portion, a force acts on the threaded portion of the sleeve in the axial direction of the sleeve. This force tends to act on the outer circumference of the lower bearing. However, the outer circumference of the lower bearing is not bonded to the inner circumferential surface of the sleeve, the force acting on the lower bearing is reduced. Accordingly, deformation, distortion, or the like of the bearing can be prevented, thus allowing smooth rotation of the sleeve without any rotational irregularity.

A carriage assembly according to the present invention is formed by using the above bearing unit. With this bearing unit, the carriage assembly rotatably supports the arms which support the magnetic heads. In addition, a magnetic disk apparatus according to the present invention is constructed by using the above bearing unit and the above carriage assembly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 4 show a magnetic disk apparatus according to an embodiment of the present invention, in which:

FIG. 1 is a perspective view of the apparatus,

FIG. 2 is an exploded perspective view showing a carriage assembly in the apparatus, FIG. 3 is a side view of the carriage assembly, and FIG. 4 is a sectional view showing a bearing unit in the carriage assembly;

FIG. 5 is a graph showing the torque characteristics of the bearing unit before a nut is tightened;

FIG. 6 is a graph showing the torque characteristics of the bearing unit after the nut is tightened;

FIG. 7 is a graph showing the torque characteristics of a conventional bearing unit before a nut is tightened;

FIG. 8 is a graph showing the torque characteristics of the conventional bearing unit after the nut is tightened;

DETAILED DESCRIPTION OF THE PREFERRED EMBODIMENTS

An embodiment in which the present invention is applied to a hard disk drive (to be referred to as an HDD hereinafter) as a magnetic disk apparatus will be described in detail with reference to the accompanying drawings.

Figure 1:
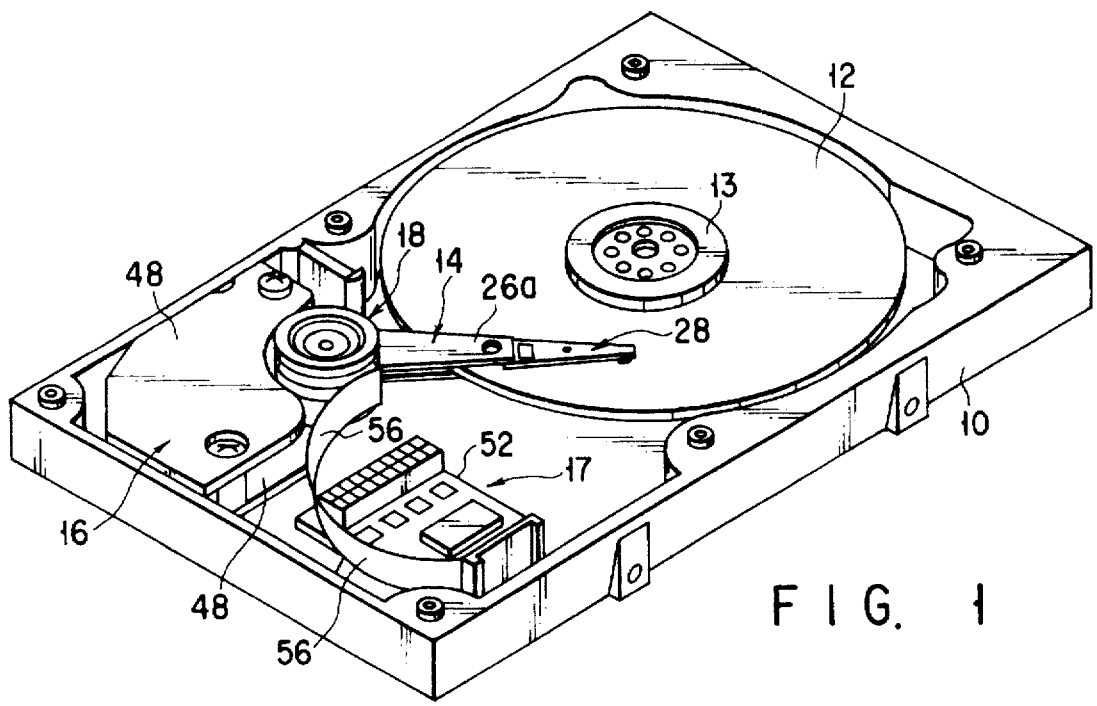

As shown in FIG. 1, the HDD includes a rectangular, box-like case 10 which is open upward, and a top cover (not shown) which is fastened to the case 10 with a plurality of screws to cover the upper end opening.

The case 10 contains a magnetic disk 12 serving as a magnetic recording medium, a spindle motor 13 for supporting and rotating the magnetic disk 12, a plurality of magnetic heads for recording/reproducing information on/from the magnetic disk 12, a carriage assembly 14 for supporting these magnetic heads so as to allow them to move with respect to the magnetic disk 12, a voice coil motor (to be referred to as a VCM hereinafter) 16 for rotating and positioning the carriage assembly 14, and a board unit 17 having a preamplifier and the like.

A printed circuit board (not shown) for controlling the operations of the spindle motor 13, the VCM 16, and the magnetic heads through the board unit 17 is fixed to the outer surface of the case 10 with screws and positioned to oppose the bottom wall of the case. The magnetic disk 12 has a diameter of 64 mm (2.5 inch). The magnetic disk 12 has magnetic recording layers on its upper and lower surfaces. The magnetic disk 12 is coaxially fitted on a sleeve (not shown) of the spindle motor 13 and rotated at a predetermined speed by the spindle motor 13.

Figure 2:
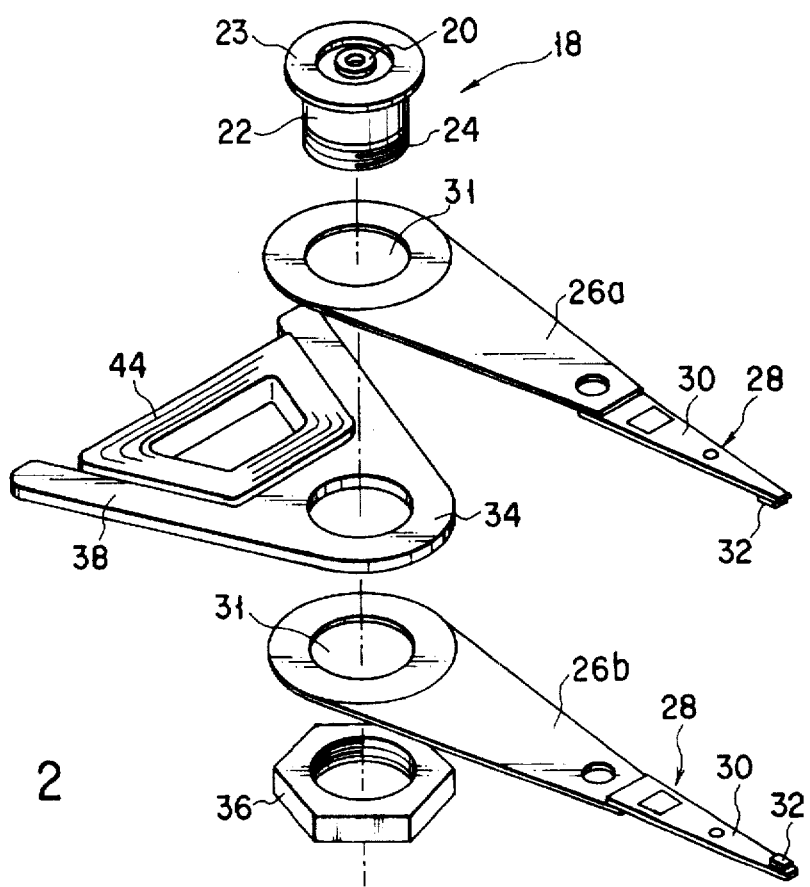
Figure 3:
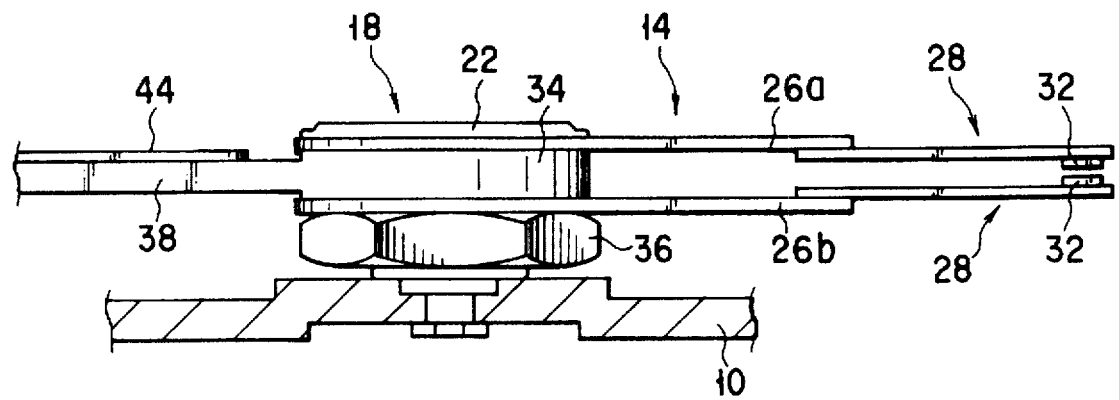

As shown in FIGS. 1 to 3, the carriage assembly 14 includes a bearing unit 18 fixed on the bottom wall of the case 10. As will be described later, the bearing unit 18 includes a support shaft 20 standing upward from the bottom wall of the case 10, and a cylindrical sleeve 22 rotatably supported on the support shaft 20 through a pair of bearings. An annular flange 23 is formed on the upper end of the sleeve 22, and a threaded portion 24 is formed on the outer circumferential surface of the lower end portion of the sleeve 22.

The carriage assembly 14 includes two arms 26a and 26b mounted on the sleeve 22, a support ring 34 (to be described later), and two magnetic head assemblies 28 supported by the respective arms 26a and 26b.

Each of the arms 26a and 26b is made of a stainless steel material such as SUS 304 and formed into a thin flat plate having a thickness of 0.3 mm or less. A through hole 31 is formed in one end, i.e., the proximal end, of each arm.

Each magnetic head assembly 28 includes an elongated suspension 30 formed of a leaf spring, and a magnetic head 32 fixed to the distal end of the suspension 30. The suspension 30 has its proximal end fixed to the distal end of the arm 26a or 26b by spot welding or bonding and extends therefrom.

Each magnetic head 32 includes a substantially rectangular slider (not shown) and a recording/reproducing thin-film head formed on the slider. The magnetic head 32 is fixed to a gimbal portion formed on the distal end portion of the suspension 30. Note that the suspension 30 may be formed integrally with the arm by the same material as that for the arm.

By inserting the sleeve 22 into the through holes 31 of the arms 26a and 26b on which the magnetic head assemblies 28 are fixed, the arms 26a and 26b are fitted on the outer circumference of the sleeve 22 while being stacked on the flange 23. The support ring 34 is fitted on the outer circumference of the sleeve 22 while being clamped between the arms 26a and 26b.

The two arms 26a and 26b and the support ring 34 serving as members to be supported, which are fitted on the outer circumference of the sleeve 22, are clamped between the flange 23 and a nut 36 threadably engaged with the threaded portion 24 of the sleeve 22 and held on the outer circumference of the sleeve 22. With this structure, the two arms 26a and 26b are positioned to be parallel to each other with a space being ensured therebetween, and extend from the sleeve 22 in the same direction.

The magnetic heads 32 of the magnetic head assemblies 28 mounted on the arms 26a and 26b are positioned to oppose each other, and can be rotated integrally with the sleeve 22.

The support ring 34 has two support frames 38 extending in the opposite direction to the arms 26a and 26b. A coil 44 as a part of the VCM 16 is fixed on these support frames 38.

As is apparent from FIG. 1, in a state in which the carriage assembly 14 having the above structure is mounted in the case 10, the magnetic disk 12 is located between the arms 26a and 26b. The magnetic heads 32 of the magnetic head assemblies 28 mounted on the arms 26a and 26b are in contact with the upper and lower surfaces of the magnetic disk 12. A predetermined head load based on the spring force of the suspension 30 is applied to each magnetic head 32 to press it against the surface of the magnetic disk 12 while the magnetic disk 12 is stopped.

As shown in FIG. 1, in the state in which the carriage assembly 14 is mounted in the case 10, the coil 44 fixed to the support frame 38 is located between a pair of yokes 48 fixed onto the case 10, and constitutes the VCM 16, together with these yokes, and a magnet (not shown) fixed to one of the yokes. With this structure, when the coil 44 is energized, the sleeve 22 of the carriage assembly 14 is rotated to move the magnetic heads 32 onto desired tracks of the magnetic disk 12.

As shown in FIG. 1, the board unit 17 has a rectangular board body 52 fixed on the bottom wall of the case 10. A plurality of electronic parts, connectors, and the like are mounted on the board body 52. The board unit 17 also includes a belt-like flexible printed circuit board (to be referred to as a FPC hereinafter) 56 for electrically connecting the board body 52 to the carriage assembly 14. The FPC 56 extends from the board body 52, and a distal end portion 56a of the FPC 56 is fixed on the bearing unit portion of the carriage assembly 14.

The structure of the bearing unit 18 of the carriage assembly 14 will be described in detail.

Figure 4:
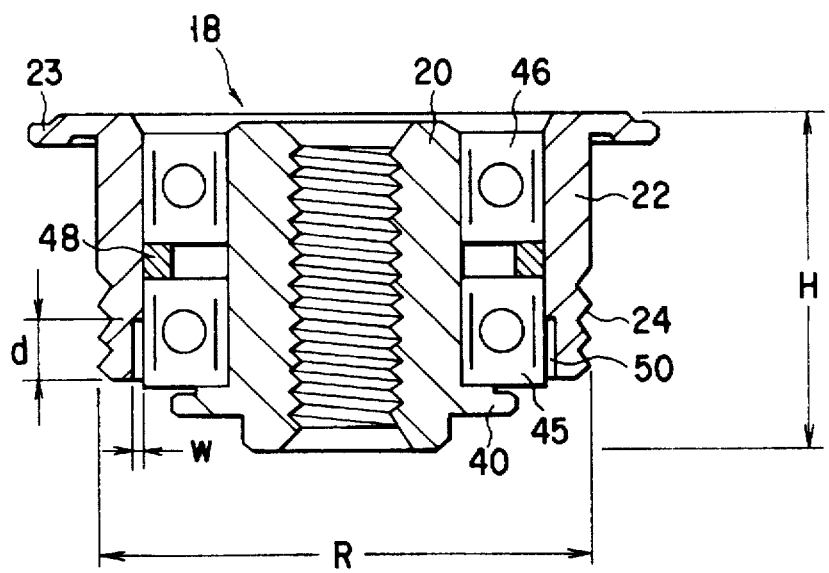

As shown in FIG. 4, the support shaft 20 of the bearing unit 18 has a cylindrical shape. A fixing threaded portion is formed on the inner circumferential surface of the support shaft 20, and an annular flange 40 is formed on the outer circumferential surface of the lower end portion of the support shaft 20. Lower and upper bearings 45 and 46, which are standard ball bearings, are fitted on the outer circumferential surface of the support shaft 20 and stacked on the flange 40. An annular shim 48 is clamped between the lower and upper bearings 45 and 46 to define a predetermined gap between the two bearings.

The cylindrical sleeve 22 is fitted on the outer circumferences of the lower and upper bearings 45 and 46 and coaxially and rotatably supported outside the support shaft 20. The annular flange 23 is formed on the outer circumference of the upper end of the sleeve 22 and positioned at almost the same level as that of the upper end of the support shaft 20.

The threaded portion 24 with which the nut 36 is threadably engaged is formed on the outer circumference of the lower end portion of the sleeve 22. The threaded portion 24 is positioned outside the lower bearing 45, i.e., aligned with the lower bearing 45 in the radial direction of the sleeve 22.

An annular groove 50 is formed in the lower end portion of the sleeve 22 and located between the threaded portion 24 and the lower bearing 45. In this embodiment, the groove 50 is formed in the inner circumferential surface of the lower end portion of the sleeve 22 to be coaxial therewith, extends to the lower end edge of the sleeve 22, and opposes the lower bearing 45.

For example, the dimensions of the bearing unit 18 having the above structure are set such that an overall height H is 6 mm, an outer diameter R of the sleeve 22 is 7 mm, and the length of the threaded portion 24 is 1.7 mm. In addition, the height of the lower and upper bearings 45 and 46 is 2 mm.

The groove 50 has a width w of 0.1 mm in the radial direction and a depth of d of 1.1 mm in the axial direction. The depth d of the groove 50 is set to a value such that the axially upper end of the groove 50 opposes almost the axially intermediate portion of the lower bearing 45, or less.

The inner and outer circumferences of the upper bearing 46 are respectively bonded to the outer circumferential surface of the support shaft 20 and the inner circumferential surface of the sleeve 22. The inner and outer circumferences of the lower bearing 45 are respectively bonded to the outer circumferential surface of the support shaft 20 and the inner circumferential surface of the sleeve 22 excluding the groove 50.

As described above, when the carriage assembly 14 is to be assembled, the two arms 26a and 26b and the support ring 34 are fitted on the sleeve 22 of the bearing unit 18 in a stacked state, and the nut 36 is threadably engaged with the threaded portion 24 of the sleeve 22. With this operation, the arms 26a and 26b and the support ring 34 are clamped between the nut 36 and the flange 23 of the sleeve 22 and held on the outer circumference of the sleeve 22.

When the nut 36 is screwed, a radially inward force component is generated in the threaded portion 24 of the sleeve 22, i.e., toward the lower bearing 45, owing to tightening of the nut 36. However, the groove 50 is formed between the threaded portion 24 and the lower bearing 45, and absorbs the above force component generated in the lower end portion of the sleeve 22 including the threaded portion 24, thereby reducing the action of the force component on the lower bearing 45. For this reason, deformation of the lower bearing 45 due to the tightening force of the nut 36 can be reduced.

In order to check rotational irregularity of the bearing unit 18 owing to the tightening force of the nut 36, the present inventor measured variations in torque required to rotate the sleeve 22 before and after the nut 36 was tightened.

FIG. 5 shows the measurement result on the bearing unit 18 before the nut 36 is threadably engaged with the threaded portion 24 of the sleeve 22, i.e., before the carriage assembly 14 is assembled. FIG. 6 shows the measurement result on the bearing unit 18 after the carriage assembly 14 is assembled by using the bearing unit 18, i.e., in a case in which the nut 36 is threadably engaged with the threaded portion 24, and the nut is disengaged after the assembly is left to stand for a predetermined period of time. Referring to FIGS. 5 and 6, the abscissa represents the rotational angle corresponding to one revolution of the sleeve 22, and the ordinate represents the torque.

As is apparent from these graphs, according to the bearing unit 18 having the above structure, the torque is kept almost constant, and the sleeve 22 is almost free from rotational irregularity before and after the nut 36 is tightened.

For comparison, FIGS. 7 and 8 show the measurement results on a conventional bearing unit without any groove, which were obtained by measuring torques by the same method as described above before and after the nut is tightened.

As shown in FIG. 7, the torque is almost constant, and almost no rotational irregularity of the sleeve occurs before the nut is tightened. In contrast to this, as shown in FIG. 8, after the nut is tightened, the torque greatly varies in accordance with the rotational angle of the sleeve, resulting in rotational irregularity. This may be because the lower bearing undergoes an abnormality such as deformation or distortion owing to the tightening force of the nut.

As is apparent from the above comparison, according to the bearing unit 18 of the this embodiment, with the groove 50 of the sleeve 22, the load acting on the lower bearing 45 owing to tightening of the nut 36 can be reduced to prevent the lower bearing from undergoing deformation or distortion. Therefore, even after the carriage assembly 14 is assembled, the bearing unit 18 capable of smooth rotation and free from rotational irregularity can be obtained.

The carriage assembly 14 using the bearing unit 18 can support the arms 26a and 26b and the magnetic heads 32 so as to allow them to smoothly move, i.e., rotate. In the HDD having the carriage assembly 14, therefore, the magnetic heads 32 can be smoothly and accurately moved and positioned to desired tracks on the magnetic disk 12 while a positional offset of the magnetic heads due to the rotational irregularity of the bearing unit 18 is prevented.

Figure 9:
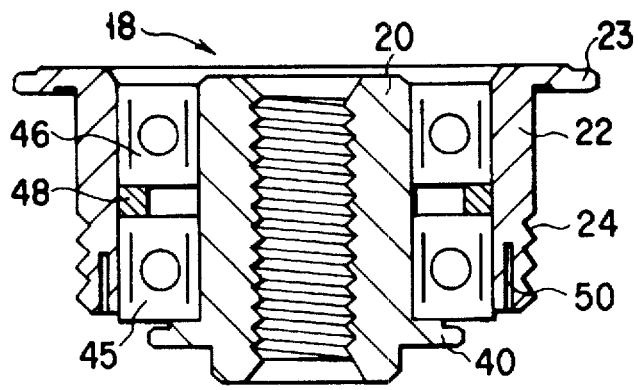
FIG. 9 is a sectional view showing a bearing unit according to a modification of the present invention.

In the above embodiment, the groove 50 of the bearing unit 18 is formed in the inner circumferential surface of the sleeve 22. It suffices, however, if the groove 50 is formed between the lower bearing 45 and the threaded portion 24. As shown in FIG. 9, therefore, the groove 50 may be formed in the sleeve 22 between the inner circumferential surface of the sleeve 22 and the threaded portion 24.

Figure 10:
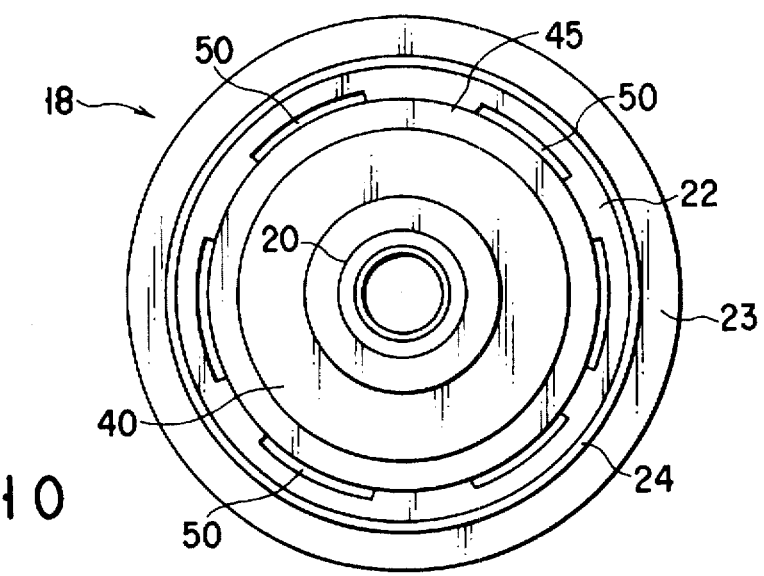
FIG. 10 is a bottom view of a bearing unit according to another modification of the present invention.

In addition, the groove 50 is not limited to a continuous, annual shape. As shown in FIG. 10, grooves may be intermittently formed at predetermined intervals in the circumferential direction of the sleeve 22.

In each of the structures shown in FIGS. 9 and 10, the groove 50 can reduce deformation, distortion, or the like of the lower bearing 45 owing to tightening of the nut 36, thereby obtaining the same effects as those in the above mentioned embodiment.

Figure 11:
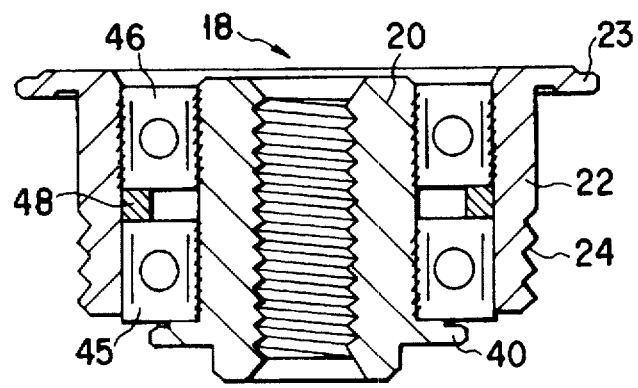
FIG. 11 is a sectional view showing a bearing unit according to another embodiment of the present invention.

FIG. 11 shows a bearing unit 18 according to another embodiment of the present invention. According to this embodiment, a fixing structure for lower and upper bearings 45 and 46 is made to be different from that in the above mentioned embodiment instead of forming a groove.

More specifically, the inner and outer circumferences of the upper bearing 46 are respectively fixed to the outer circumferential surface of a support shaft 20 and the inner circumferential surface of a sleeve 22 with an adhesive. In contrast to this, only the inner circumference of the lower bearing 45 is fixed to the outer circumferential surface of the support shaft 20, but the outer circumference of the lower bearing 45 is not bonded to the inner circumferential surface of the sleeve 22.

Other structures of the bearing unit 18 are the same as those of the bearing unit in the above mentioned embodiment. The same reference numerals in this embodiment denote the same parts as in the above mentioned embodiment, and a detailed description thereof will be omitted.

According to another embodiment having the above structure, since the outer circumference of the lower bearing 45 aligned with a threaded portion 24 of the sleeve 22 in the radial direction is not bonded to the sleeve 22, the lower bearing 45 can slightly move in the axial direction of the sleeve 22 relatively to the sleeve 22. For this reason, even when a force component is generated in the threaded portion 24 in the axial direction of the sleeve 22 owing to a tightening force generated when the nut is threadably engaged with the threaded portion 24, the force component acing on the lower bearing 45 in the axial direction can be reduced.

The bearing unit 18 therefore can reduce deformation, distortion, or the like of the lower bearing 45 owing to the tightening force of the nut, and undergoes little rotational irregularity. By assembling a carriage assembly 14 and an HDD using this bearing unit 18, a carriage assembly and an HDD which can smoothly and accurately move and position the magnetic heads can be provided.

The present invention is not limited to the above embodiments, and various changes and modifications can be made without departing from the scope of the invention.

For example, the dimensions of the respective parts of the bearing unit can be variously changed, as needed, and the numbers of support arms and magnetic heads can be increased, as needed.

What is claimed is:

1. A bearing unit of an information recording for rotatably supporting a member to be supported, comprising:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the member on the outer circumferential surface of the sleeve between the flange and the nut;

the plurality of bearings including a lower bearing which is aligned with the threaded portion in a radial direction of the sleeve, and the sleeve having a groove which is located between the threaded portion and the lower bearing, for reducing a tightening force of the nut which acts on the lower bearing.

2. A bearing unit according to claim 1, wherein the groove is formed in an inner circumferential surface of the sleeve to oppose the lower bearing.

3. A bearing unit according to claim 1, wherein the groove is formed in the sleeve between an inner circumferential surface of the sleeve and the threaded portion.

4. A bearing unit according to claim 1, wherein the groove has an annular shape coaxial with the sleeve.

5. A bearing unit according to claim 1, wherein the groove is intermittently formed in a circumferential direction of the sleeve.

6. A carriage assembly of a magnetic disk apparatus, which movably supports magnetic heads with respect to a magnetic disk, the carriage assembly comprising:

a bearing unit; and a plurality of arms on which the magnetic heads are mounted and which is rotatably supported by the bearing unit;

the bearing unit including:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the arms on the outer circumferential surface of the sleeve between the flange and the nut;

the plurality of bearings including a lower bearing aligned with the threaded portion in a radial direction of the sleeve, and the sleeve having a groove which is located between the threaded portion and the lower bearing, for reducing a tightening force of the nut which acts on the lower bearing.

7. A magnetic disk apparatus comprising:

a magnetic disk;

a plurality of magnetic heads respectively arranged to oppose upper and lower surfaces of the magnetic disk, for recording/reproducing information on/from the magnetic disk;

a carriage assembly for movably supporting the magnetic heads with respect to the magnetic disk; and drive means for rotating the carriage assembly to move the magnetic heads to desired positions on the magnetic disk;

the carriage assembly including a bearing unit, and a plurality of arms on which the magnetic heads are mounted and which are rotatably supported by the bearing unit, the bearing unit including:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the arms on the outer circumferential surface of the sleeve between the flange and the nut;

the plurality of bearings including a lower bearing aligned with the threaded portion in a radial direction of the sleeve, and the sleeve having a groove which is located between the threaded portion and the lower bearing, for reducing a tightening force of the nut which acts on the lower bearing.

8. A magnetic disk apparatus according to claim 7, wherein the groove is formed in an inner circumferential surface of the sleeve to oppose the lower bearing.

9. A magnetic disk apparatus according to claim 7, wherein the groove is formed in the sleeve between an inner circumferential surface of the sleeve and the threaded portion.

10. A magnetic disk apparatus according to claim 7, wherein the groove has an annular shape coaxial with the sleeve.

11. A magnetic disk apparatus according to claim 7, wherein the groove is intermittently formed in a circumferential direction of the sleeve.

12. A bearing unit of an information recording for rotatably supporting a member to be supported, comprising:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the member on the outer circumferential surface of the sleeve between the flange and the nut;

wherein the lower bearing has an outer circumferential surface which is in contact with an inner circumferential surface of the sleeve without an adhesive interposed, and an inner circumferential surface bonded to an outer circumferential surface of the support shaft with an adhesive, and remaining bearings of the bearings have inner and outer circumferential surfaces which are respectively bonded to the outer circumferential surface of the support shaft and the inner circumferential surface of the sleeve with an adhesive.

13. A carriage assembly of a magnetic disk apparatus which movably supports magnetic heads with respect to a magnetic disk, the carriage assembly comprising:

a bearing unit; and a plurality of arms on which the magnetic heads are mounted and which is rotatably supported by the bearing unit;

the bearing unit including:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the member on the outer circumferential surface of the sleeve between the flange and the nut;

wherein the lower bearing has an outer circumferential surface which is in contact with an inner circumferential surface of the sleeve without an adhesive interposed, and an inner circumferential surface bonded to an outer circumferential surface of the support shaft with an adhesive, and remaining bearings of the bearings have inner and outer circumferential surfaces which are respectively bonded to the outer circumferential surface of the support shaft and the inner circumferential surface of the sleeve with an adhesive.

14. A magnetic disk apparatus comprising:

a magnetic disk;

a plurality of magnetic heads respectively arranged to oppose upper and lower surfaces of the magnetic disk, for recording/reproducing information on/from the magnetic disk;

a carriage assembly for movably supporting the magnetic heads with respect to the magnetic disk; and drive means for rotating the carriage assembly to move the magnetic heads to desired positions on the magnetic disk;

the carriage assembly including a bearing unit, and a plurality of arms on which the magnetic heads are mounted and which are rotatable supported by the bearing unit, the bearing unit including:

a support shaft;

a cylindrical sleeve arranged to coaxially surround the support shaft and having a first end portion on which a flange is formed, and a second end portion having an outer circumferential surface on which a threaded portion is formed;

a plurality of bearings arranged between the support shaft and the sleeve to be spaced apart from each other in an axial direction of the support shaft, for rotatably supporting the sleeve on the support shaft; and a nut threadably engaged with the threaded portion to hold the arms on the outer circumferential surface of the sleeve between the flange and the nut;

wherein the lower bearing has an outer circumferential surface which is in contact with an inner circumferential surface of the sleeve without an adhesive interposed, and an inner circumferential surface bonded to an outer circumferential surface of the support shaft with an adhesive, and remaining bearings of the bearings have inner and outer circumferential surfaces which are respectively bonded to the outer circumferential surface of the support shaft and the inner circumferential surface of the sleeve with an adhesive.

\* \* \* \* \*